United States Patent Office 3,146,179
Patented Aug. 25, 1964

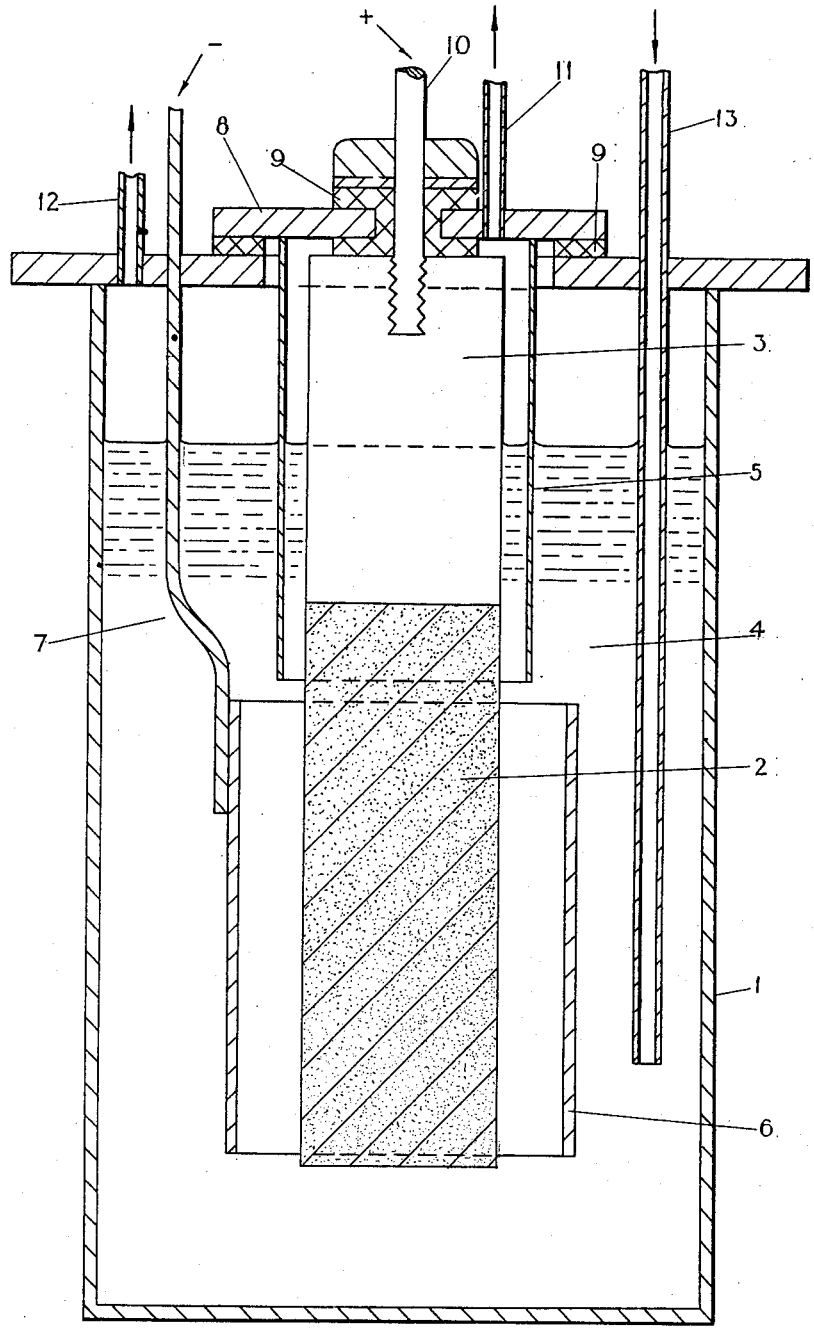

3,146,179
PROCESS FOR THE ELECTROLYTIC PRODUCTION OF FLUORINE AND APPARATUS THEREFOR
Albert Davies, Widnes, England, assignor to Imperial Chemical Industries Limited, London, England, a corporation of Great Britain
Filed Mar. 15, 1962, Ser. No. 179,920
Claims priority, application Great Britain Apr. 5, 1961
10 Claims. (Cl. 204—60)

This invention relates to improvements in or relating to a process for the electrolytic production of fluorine of reduced hydrogen fluoride content and to apparatus therefor.

Electrolytic fluorine cells normally comprise a vessel containing an electrolyte consisting of a fused mixture of potassium fluoride and hydrogen fluoride provided with suitable heating and cooling means, a carbon anode and a cathode of steel or other suitably resistant metal and a barrier or partition surrounding the anode, the object of the barrier being to prevent mixing of the hydrogen and fluorine evolved at the cathode and anode respectively.

When using carbon anodes of relatively high permeability of 1 or more it is normally found that the fluorine evolved contains a high proportion of hydrogen fluoride of the order of 7% to 10% by volume and sometimes more. The HF may be removed by condensation or by the use of suitable absorbents, but obviously it is desirable for the fluorine leaving the cell to contain as small an amount as possible of the hydrogen fluoride impurity so as to reduce to a minimum the scale of the condensation or absorption steps. Apart from this it is desirable to minimise the rate of loss of HF from the cell and so reduce the frequency of HF addition.

According to the present invention a process for the electrolytic production of fluorine of reduced hydrogen fluoride content comprises electrolysing a fused mixture of potassium fluoride and hydrogen fluoride having a composition approximating KF.1.8HF to KF.2.2HF at a temperature of 80° C. to 110° C. when using a composite carbon anode, the upper portion of which anode is of ordinary electrode carbon of low permeability and the lower portion of which anode is of carbon of higher permeability than the upper portion of the anode, the junction of the two portions being below the electrolyte surface.

The permeability of the carbon of the lower portion of the anode is generally at least 0.5. Good results have been obtained with carbons of a permeability of approximately 1, although carbons of higher permeability may be employed. Ordinary electrode carbon which constitutes the upper portion of the anode is relatively impermeable as compared with the lower portion of the electrode, the permeability of said upper portion being not substantially greater than 0.05. Permeability is defined in terms of cubic feet of air passing per minute per square foot of surface through one inch thickness of anode material under an imposed pressure equivalent to two inches of water. The determination of the permeability of the two portions of the anode is carried out on cylinders one inch in diameter and one inch long which are mounted tightly in a rubber holder. The permeability of a particular source of carbon is taken as the mean of the measurements of the quantity of air passing under an imposed pressure of two inches of water through two cylinders as above described, which are cut at right angles to one another from a sample of the carbon.

Apart from the feature of utilising a composite carbon anode the junction whereof is below the electrolyte surface, a barrier or partition surrounding the anode should preferably extend downwardly at least as far as the junction of the two portions of the anode in order to prevent spread and intermixing of fluorine with the hydrogen. Intermixing is liable to occur if the barrier is situated well above the junction of the two portions of the anode. The barrier or partition can have a downwardly and inwardly projecting slope or curve so shaped as to deflect any hydrogen that rises from the cathode and comes into contact with the barrier upwardly and outwardly away from the anode. When the anode is cylindrical the partition may be in the form of a hollow cylinder the bottommost portion of which is inturned to form a flange which extends downwardly towards the anode. Obviously the barrier should not extend too far below the junction of the two portions of the anode since this would cut off an effective portion of the anode facing the cathode. Preferably also the cathode is situated wholly beneath the barrier facing the effective and lower portion of the anode.

The present invention also includes electrolytic fluorine cells comprising a vessel for the electrolyte and provided with suitable heating and cooling means, a cathode, a composite carbon anode, the upper portion of which is of ordinary electrode carbon of low permeability and the lower portion of which anode is of carbon of higher permeability than the upper portion of the anode, the junction of these two portions being below the electrolyte surface and a barrier situated between cathode and anode preferably extending downwardly at least as far as the junction of the two portions of the anode.

The carbon anodes may be of various shapes but one of substantially uniform cross section such as a cylindrical anode or one of rectangular cross section is very suitable.

One form of cell suitable for carrying out the invention is illustrated in the diagrammatic drawing accompanying the provisional specification which represents a vertical section through the said cell. Referring to the drawing, 1 is a container of mild steel or other suitably resistant metal provided with a suitable heating jacket (not shown in the drawing). The carbon anode has a lower portion 2 of higher permeability than the upper portion 3. The carbon anode is partly submerged in the electrolyte 4. A gas impermeable barrier 5 surrounds the upper portion 3 of the anode and extends below the junction of the two portions of the anode. A cathode 6 which may be of mild steel, copper or other material substantially resistant to the electrolyte is situated wholly beneath the barrier and is supported by an electrically conducting rod 7 passing through the top of container 1. The lid 8 is insulated from the container and from the upper portion of the anode 3 by insulating material 9. An electrically conducting rod 10 insulated from the cell lid 8 by insulating material 9 is connected to the upper portion of the anode. The pipe 11 for fluorine take-off is connected through the cell lid 8 to the space between the upper portion of the anode 3 and the gas barrier 5. The pipe 12 passing through the top of container 1 is for take-off of hydrogen. The pipe 13 passing through the top of the container into the electrolyte 4 is for addition of hydrofluoric acid to the electrolyte.

The following example illustrates but does not limit the invention.

*Example*

In an electrolytic cell utilised in this example the composite anode comprised a cylindrical block of carbon 8 inches long and 2 inches in diameter. The lower portion 5 inches in length had a permeability of 1 while the upper portion 3 inches in length had a permeability of approximately 0.05. The anode was then immersed to a depth of 6.6 inches in an electrolyte of composition KF.1.8HF to KF.2.2HF maintained at a temperature of 80-85° C. An impermeable gas barrier of "Monel" (registered trademark) surrounded the whole of the upper, relatively impermeable, portion of the anode and extended downward below the upper portion to surround a ¾-inch length of the lower, permeable portion of the anode. A mild steel cathode situated below the barrier surrounded the lower portion of the anode. The cell was operated at a current density of 0.4 amp./sq. inch and the evolved fluorine was analysed for HF content. The average of eight determinations showed that the fluorine contained 4.6% by volume of hydrogen fluoride.

*Comparison.*—The above procedure was repeated with the exception that the carbon anode this time consisted entirely of carbon of the same permeability as that of the lower portion of the composite anode, namely 1.0. The average of eleven determinations showed that the fluorine contained 7.1% by volume of hydrogen fluoride.

What we claim is:

1. A process for the electrolytic production of fluorine of reduced hydrogen fluoride content which comprises: immersing in a fused mixture of potassium fluoride and hydrogen fluoride having a KF to HF ratio of between about 1:1.8 and 1:2.2 a composite carbon anode the upper portion of which is of ordinary electrode carbon of low permeability and the lower portion of which is of carbon of higher permeability than the upper portion, said anode being immersed to the extent that the junction of said upper and lower portions is below the surface of said fused mixture; and electrolyzing said fused mixture between said anode and a cathode at a temperature of 80° C. to 110° C.

2. A process for the electrolytic production of fluorine of reduced hydrogen fluoride content which comprises: providing a fused mixture of potassium fluoride and hydrogen fluoride having a KF to HF ratio of between about 1:1.8 and 1:2.2; providing a composite rod-like anode of substantially uniform solid cross section, the upper portion of which is of carbon having a permeability not substantially greater than 0.05 and the lower portion of which is of carbon having a permeability of at least 0.5; immersing said anode into said fused mixture to the extent that the junction between said portions is below the surface of said fused mixture; and electrolyzing said fused mixture between said anode and a cathode at a temperature of 80° C. to 110° C.

3. An electrolytic cell for the production of fluorine of reduced hydrogen fluoride content comprising: a vessel for the electrolyte; a composite rod-like carbon anode of substantially uniform, solid cross section, the upper portion of which is of carbon having a permeability not substantially greater than 0.05 and the lower portion of which is of carbon having a permeability of at least 0.5; means mounting said anode within said container to locate the junction of said upper and lower portions below the surface of an electrolyte when the same is present in said vessel; a gas impermeable barrier surrounding said anode and extending downwardly at least as far as said junction; and a cathode below said barrier.

4. A process as claimed in claim 1 in which the permeability of the carbon of the lower portion of the anode is at least 0.5.

5. A process as claimed in claim 1 in which the permeability of the carbon of the upper portion of the anode is not substantially greater than 0.05.

6. A process as claimed in claim 1 further comprising providing a barrier surrounding the anode and extending downwardly at least as far as the junction of the two portions of the anode.

7. An electrolytic cell for the production of fluorine of reduced hydrogen fluoride content by electrolysis of a fused mixture of potassium fluoride and hydrogen fluoride having a KF to HF ratio of between about 1:1.8 and 1:2.2 comprising a vessel for the electrolyte, a cathode, a composite carbon anode, the upper portion of which is of ordinary electrode carbon of low permeability and the lower portion of which anode is of carbon of higher permeability than the upper portion of the anode, means mounting said anode within said container to locate the junction of said upper and lower portions below the surface of the electrolyte when the same is present in said vessel and a barrier situated between cathode and anode.

8. An electrolytic cell as claimed in claim 7 in which the permeability of the carbon of the lower portion of the anode is at least 0.5.

9. An electrolytic cell as claimed in claim 7 in which the permeability of the carbon of the upper portion of the anode is not substantially greater than 0.05.

10. An electrolytic cell as claimed in claim 7 wherein the barrier extends downwardly at least as far as the junction of the two portions of the anode.

References Cited in the file of this patent
UNITED STATES PATENTS

| | | |
|---|---|---|
| 2,684,940 | Rudge et al. | July 27, 1954 |
| 2,996,446 | Davies et al. | Aug. 15, 1961 |
| 3,022,233 | Olstowdki | Feb. 20, 1962 |